(12) United States Patent
Trouve et al.

(10) Patent No.: US 11,124,285 B2
(45) Date of Patent: Sep. 21, 2021

(54) AERODYNAMIC/HYDRODYNAMIC PROFILE WITH A COMPOSITE REINFORCED OBLONG FOAM CORE

(71) Applicants: Airbus Operations (S.A.S.), Toulouse (FR); Airbus (S.A.S.)

(72) Inventors: Rodolphe Trouve, Toulouse (FR); Jean-Claude Lacombe, Blagnac (FR); Julien Rodes, Seilh (FR); Thomas Schutz, Villeneuve Tolosane (FR)

(73) Assignees: Airbus Operations (S.A.S.), Toulouse (FR); Airbus (S.A.S.), Blagnac (FR)

( * ) Notice: Subject to any disclaimer, the term of this patent is extended or adjusted under 35 U.S.C. 154(b) by 225 days.

(21) Appl. No.: 16/037,269

(22) Filed: Jul. 17, 2018

(65) Prior Publication Data

US 2019/0023372 A1 Jan. 24, 2019

(30) Foreign Application Priority Data

Jul. 18, 2017 (FR) ...................................... 1756807

(51) Int. Cl.
  *B64C 3/26* (2006.01)
  *B64C 3/18* (2006.01)
  (Continued)

(52) U.S. Cl.
  CPC ............ *B64C 3/26* (2013.01); *B29D 99/0025* (2013.01); *B64C 3/20* (2013.01); *B29L 2031/3085* (2013.01); *B64C 3/185* (2013.01)

(58) Field of Classification Search
  CPC .. B64C 3/20; B64C 3/26; B64C 3/185; B64C 27/473; B64C 2027/4736; F03D 1/0683
  See application file for complete search history.

(56) References Cited

U.S. PATENT DOCUMENTS

| | | | | |
|---|---|---|---|---|
| 2,945,655 A | * | 7/1960 | Snyder | B64C 3/26 244/123.1 |
| 3,519,228 A | * | 7/1970 | Windecker | B64C 3/26 244/123.5 |

(Continued)

FOREIGN PATENT DOCUMENTS

| | | |
|---|---|---|
| DE | 19528664 A1 | 2/1997 |
| FR | 2381662 A1 | 9/1978 |

(Continued)

OTHER PUBLICATIONS

French Search Report for French Application No. 1756807 dated Jul. 18, 2017.

*Primary Examiner* — Joseph W Sanderson
(74) *Attorney, Agent, or Firm* — Jenkins, Wilson, Taylor & Hunt, P.A.

(57) ABSTRACT

An aerodynamic profile including a skin defining the outer surface of the aerodynamic profile, a leading edge, a trailing edge and a central portion representing at least 50% of the chord of the profile. The profile includes a hollow core of composite material reinforced with a textile having unidirectional fibers. The hollow core has, in cross section, an oblong shape that is rounded, in particular at each of its ends. The skin bears against the hollow core over the length of the central portion of the aerodynamic profile, both on the pressure side and on the suction side of the profile. The reinforcement with a textile having unidirectional fibers permits an ideal orientation of reinforcing fibers in order to optimize mechanical properties in certain directions. The shape of the hollow core, elongate along the chord of the profile and rounded, lends it great resistance to deformation.

17 Claims, 2 Drawing Sheets

(51) Int. Cl.
  *B64C 3/20*   (2006.01)
  *B29D 99/00*  (2010.01)
  *B29L 31/30*      (2006.01)

(56) References Cited

U.S. PATENT DOCUMENTS

| | | | | |
|---|---|---|---|---|
| 4,213,739 A * | 7/1980 | Euler | ................ | B29D 99/0025 |
| | | | | 416/226 |
| 4,298,417 A * | 11/1981 | Euler | ................ | B29D 99/0025 |
| | | | | 156/228 |
| 4,524,499 A * | 6/1985 | Grimes | ................ | B64C 11/26 |
| | | | | 29/450 |
| 4,538,780 A * | 9/1985 | Roe | ................ | B64C 3/20 |
| | | | | 244/123.5 |
| 4,935,277 A * | 6/1990 | Le Balc'h | ................ | B64C 27/473 |
| | | | | 428/71 |
| 5,269,657 A * | 12/1993 | Garfinkle | ................ | B29C 70/20 |
| | | | | 416/226 |
| 5,430,937 A * | 7/1995 | Leahy | ................ | B29C 70/446 |
| | | | | 29/889.6 |
| 5,755,558 A * | 5/1998 | Reinfelder | ................ | B64C 27/473 |
| | | | | 416/230 |
| 6,976,829 B2 * | 12/2005 | Kovalsky | ................ | B64C 27/46 |
| | | | | 416/226 |
| 7,165,945 B2 * | 1/2007 | Kovalsky | ................ | B29C 70/222 |
| | | | | 416/226 |
| 7,547,193 B2 * | 6/2009 | Moffitt | ................ | B64C 3/14 |
| | | | | 416/228 |
| 8,114,329 B2 * | 2/2012 | Karem | ................ | B29C 70/683 |
| | | | | 264/258 |
| 9,156,559 B2 * | 10/2015 | Grip | ................ | B64D 27/24 |
| 9,291,151 B2 * | 3/2016 | Mironov | ................ | B29C 70/342 |
| 9,638,048 B2 * | 5/2017 | Measom | ................ | B23P 15/04 |
| 9,957,036 B2 * | 5/2018 | Sanderson | ................ | B64C 3/10 |
| 10,155,298 B2 * | 12/2018 | Araujo | ................ | B24C 1/086 |
| 10,239,604 B2 * | 3/2019 | Foskey | ................ | B64C 11/26 |
| 10,513,326 B2 * | 12/2019 | Brakes | ................ | B64D 27/26 |
| 10,562,607 B2 * | 2/2020 | Filsegger | ................ | B64C 9/323 |
| 2005/0013694 A1 * | 1/2005 | Kovalsky | ................ | B64C 27/46 |
| | | | | 416/226 |
| 2005/0042109 A1 * | 2/2005 | Kovalsky | ................ | B29C 70/222 |
| | | | | 416/230 |
| 2007/0020104 A1 * | 1/2007 | Moffitt | ................ | B64C 3/14 |
| | | | | 416/223 R |
| 2009/0220747 A1 * | 9/2009 | Karem | ................ | B32B 5/12 |
| | | | | 428/172 |
| 2012/0237356 A1 * | 9/2012 | Mironov | ................ | F03D 1/0675 |
| | | | | 416/232 |
| 2013/0099063 A1 * | 4/2013 | Grip | ................ | B64C 3/185 |
| | | | | 244/219 |
| 2013/0165024 A1 * | 6/2013 | Araujo | ................ | B24C 1/08 |
| | | | | 451/75 |
| 2014/0271215 A1 * | 9/2014 | Measom | ................ | F01D 5/282 |
| | | | | 416/224 |
| 2014/0284431 A1 * | 9/2014 | Grankaell | ................ | B29D 99/0028 |
| | | | | 244/90 R |
| 2015/0064013 A1 * | 3/2015 | Measom | ................ | B64C 11/26 |
| | | | | 416/226 |
| 2015/0266572 A1 * | 9/2015 | Nagle | ................ | F01D 5/282 |
| | | | | 416/226 |
| 2017/0174313 A1 * | 6/2017 | Brakes | ................ | B64C 3/20 |
| 2017/0334548 A1 * | 11/2017 | Foskey | ................ | B64C 29/0033 |
| 2018/0002038 A1 * | 1/2018 | Littlejohn | ................ | B64F 5/10 |
| 2018/0127083 A1 * | 5/2018 | Filsegger | ................ | B32B 5/18 |
| 2019/0315451 A1 * | 10/2019 | Seminel | ................ | B29C 70/446 |
| 2019/0360510 A1 * | 11/2019 | Broers | ................ | B32B 15/046 |
| 2021/0047031 A1 * | 2/2021 | Hayashida | ................ | B64C 11/32 |

FOREIGN PATENT DOCUMENTS

| | | |
|---|---|---|
| FR | 2617119 | 12/1988 |
| FR | 3037315 A1 | 12/2016 |
| WO | WO 2011/035541 A1 | 3/2011 |

\* cited by examiner

AERODYNAMIC/HYDRODYNAMIC PROFILE WITH A COMPOSITE REINFORCED OBLONG FOAM CORE

CROSS-REFERENCE TO RELATED APPLICATION

This application claims the benefit of and priority to French patent application 17 56807 filed on Jul. 18, 2017, the entire disclosure of which is incorporated by reference herein.

TECHNICAL FIELD

The disclosure herein relates to the field of construction of parts for forming aerodynamic profiles. It can find application in particular in the field of aeronautics, for example for obtaining aerodynamic profiles for aircraft. It can also find application in the nautical field. It relates more specifically to the formation of an aerodynamic profile made of fiber-reinforced composite material.

BACKGROUND

An aerodynamic profile can refer, in general terms, to the form of the contour, as seen in cross section, of an element moving relative to a surrounding flow. In aeronautics, this form is designed to obtain particular characteristics, such as, for example, drag, lift and other properties. By extension, the expression "aerodynamic profile" is used, as in the present document, to refer to the physical part having such a shape, which may be constant or vary, over a given length or span.

In the context of an aircraft, an aerodynamic profile for an aircraft may for example correspond to a wing, an aileron, a wingtip winglet (sometimes also "sharklet"), an empennage, a structural fairing, a flap, or the like, or a portion of a previously mentioned element.

Aerodynamic profiles of aircraft are frequently subjected to considerable mechanical stresses, both in flight and on the ground. The search for ever greater aerodynamic performance, for example drag reduction in order to improve the fuel consumption of aircraft, has as a consequence the adoption of profiles of complex shape, which are often quite thin. Added to this is the necessity of reacting mechanical stresses applied to the profile, in particular shear loads.

An aerodynamic profile of an aircraft, as a physical part, is often made by using a riveted metallic skin to cover a frame, which is also metallic and which comprises longitudinal ribs that are connected to one another by spars and transverse stiffeners and shear webs, and by adding, to the assembly thus formed, a leading edge and a trailing edge.

The abovementioned considerations make it technically ever more complex to construct aerodynamic profiles of aircraft, and make the profiles potentially heavy and costly.

In this context, it is known to make an aerodynamic profile out of composite material. For example, document FR 2 617 119 discloses a helicopter blade made of composite material. The aerodynamic profile proposed in that document comprises a structural core to which is applied a cladding covering. Whereas the structural core is formed so as to include all of the structural elements of the aerodynamic profile, the cladding covering, which comprises an external shell and a shaping layer, is not load-bearing.

Nonetheless, such a configuration is not optimal in terms of mechanical characteristics added to the mass of the profile, and does not permit adaptation to each desired application, which may require reaction of predominant forces in one direction or in certain directions.

SUMMARY

The disclosure herein aims to provide an aerodynamic profile that is lightweight and has a simple overall architecture while making it possible to obtain profiles of complex shape, and that permits optimized reaction of forces, for example of shear stresses applied to the profile.

Thus, the disclosure herein relates to an aerodynamic profile, comprising a skin defining the outer surface of the aerodynamic profile, the aerodynamic profile comprising a leading edge, a trailing edge and a central portion representing at least 50% of the chord of the profile. The aerodynamic profile comprises a hollow core made of composite material reinforced with a textile having unidirectional fibers. The hollow core has, in cross section, an oblong shape that is rounded, in particular at each of its ends. The skin bears against the hollow core over the length of the central portion of the aerodynamic profile, both on the pressure side and on the suction side of the aerodynamic profile.

The hollow core made of composite material, to which a skin is attached so as to define the profile apart from those portions of the profile forming the leading edge and the trailing edge, provides a basic structure that is simple and has considerable mechanical characteristics. The fact that it is reinforced with a textile having unidirectional fibers permits an ideal orientation of reinforcing fibers in the reinforced composite material, which optimizes the mechanical properties in certain directions, and/or in certain regions of the aerodynamic profile, and reacts the forces applied to the profile in this direction.

The shape of the hollow core is elongate along the chord of the profile and is rounded, and is very resistant to deformation.

The skin may be made of composite material or of composite material covered with a metallic outer layer. The composite material of the skin may be reinforced with a textile having unidirectional fibers.

The aerodynamic profile may further comprise a transverse beam made of composite material arranged in the hollow core.

The composite material used has for example a polymer matrix.

The hollow core may comprise at least one planar outer surface.

The hollow core having a suction-side wall, a pressure-side wall, and two connecting walls between the suction-side wall and the pressure-side wall, the reinforcing fibers of the suction-side wall and of the pressure-side wall may be predominantly oriented parallel to the skin, along a reference direction essentially perpendicular to the chord of the profile, and the fibers of the connecting walls may then be oriented at an angle of approximately 45° and/or approximately 135° with respect to the reference direction.

Where applicable, the reinforcing fibers of the skin may be essentially oriented at an angle of approximately 45° and/or approximately 135° with respect to the reference direction.

In an aerodynamic profile according to one embodiment of the disclosure herein, at least an internal volume defined by the hollow core over the length of the central portion, or by the skin at the leading edge and the trailing edge, may be filled with a foam.

An aerodynamic profile of that kind may comprise a first foam that fills the internal volume of the hollow core, and a second foam, different from the first foam, that fills the internal volume of the leading edge and the internal volume of the trailing edge.

The aerodynamic profile may be an aircraft profile for example: a wing, an aileron, a wingtip winglet, an empennage, a fairing, a flap. The aerodynamic profile may be a foil for a nautical application such as a boat foil. The aerodynamic profile may be a portion of any previously mentioned element, by way of example of an aerodynamic profile.

BRIEF DESCRIPTION OF THE DRAWINGS

Yet other features and advantages of the disclosure herein will appear in the following description.

In the appended drawings, provided by way of non-limiting examples.

DETAILED DESCRIPTION

Figure 1:
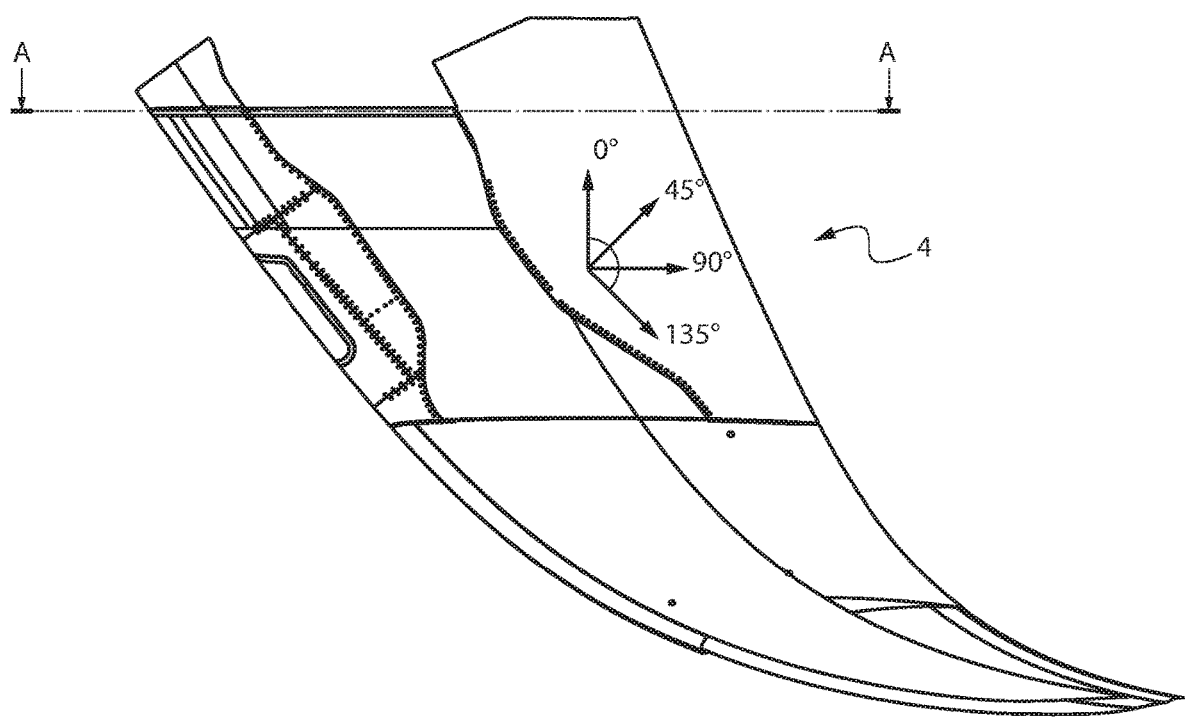
FIG. 1 illustrates, in a three-dimensional cutaway schematic view, a wingtip winglet.

The profile shown in order to illustrate the disclosure herein by way of example corresponds to a wingtip winglet, that is to say a winglet which is located at the tip of a wing and which serves to reduce turbulence and drag. The wingtip winglet 4 shown in FIG. 1 is an example of a part having a complex three-dimensional geometry and a cross section (that is to say the profile, in the sense of the contour shape) that varies.

Figure 2:
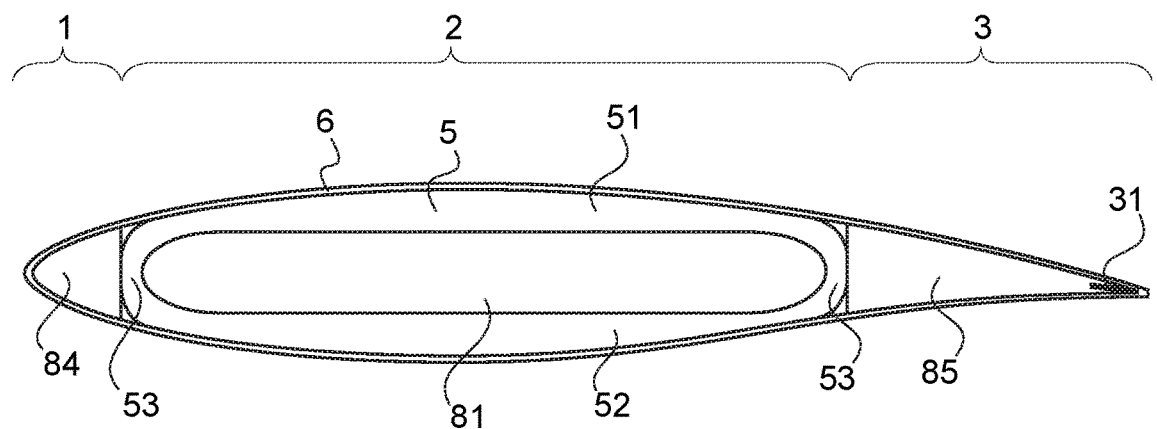
FIG. 2 illustrates, in a schematic section view, an aircraft aerodynamic profile according to one embodiment of the disclosure herein, designed for profiles subjected to moderate mechanical stresses.

FIG. 2 shows, in a schematic section view, an aircraft aerodynamic profile according to one embodiment of the disclosure herein. The view of FIG. 2 corresponds to the view of a profile as seen in the plane of section A-A shown in FIG. 1.

The aerodynamic profile comprises a leading edge 1 (which, by extension, designates the leading edge proper and that portion of the profile that is located forward of a forward spar 21), a central portion 2 located between the forward spar 21 and a rear spar 22, and a trailing edge 3 (which, by extension, designates the trailing edge proper and that portion of the profile that is located aft of the rear spar 22).

The embodiment shown in FIG. 2 is suitable for an aerodynamic profile subjected to low or moderate mechanical stresses.

The aerodynamic profile shown in FIG. 2 is made essentially or entirely of composite material. Therein, the framework present in a metallic aerodynamic profile according to the prior art is replaced with a hollow core 5. The hollow core 5 extends over all of that portion of the profile that corresponds to the central portion 2. The central portion extends over at least 50% of the chord of the profile. It is noted that chord of a profile corresponds to the shortest distance between the leading edge and the trailing edge of the profile, that is to say the length of the straight line segment connecting the leading edge to the trailing edge. By extension, the chord also corresponds to the straight line segment connecting the leading edge to the trailing edge. The hollow core 5 comprises a suction-side wall 51 and a pressure-side wall 52.

Figure 3:
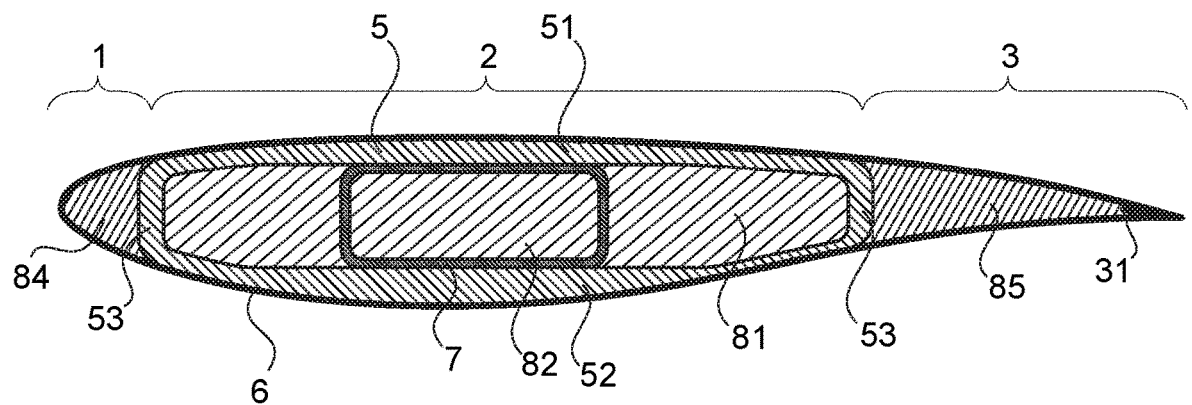
FIG. 3 shows, in a schematic section view, an aircraft aerodynamic profile according to one embodiment of the disclosure herein, designed for profiles subjected to substantial mechanical stresses.

The hollow core 5 has an oblong shape. Thus, it has, in cross section (as shown in FIGS. 2 and 3), an overall shape which is rounded, in particular at the ends of the oblong shape. That may, depending on the aerodynamic profile formed, lend it an overall shape somewhat similar in cross section to a rugby ball, more or less flattened.

The hollow core 5 may comprise one or more planar outer surfaces. The planar surface(s) may be located on the suction-side wall 51 and/or on the pressure-side wall 52.

The profile further comprises a skin 6. The skin 6 defines the outer surface, that is to say the contour, of the aerodynamic profile. The skin 6 is in contact with the suction-side wall 51 of the hollow core 5 so as to form the suction side of the central portion 2 of the aerodynamic profile. Similarly, the skin 6 is in contact with the pressure-side wall 52 so as to form the pressure side of the central portion 2 of the aerodynamic profile. The skin 6 also forms the leading edge 1 and the trailing edge 3 of the aerodynamic profile. That can be brought about with no added parts to construct the profile, apart from, if applicable, a trailing edge reinforcement 31 which may for example consist of or comprise a metal plate, for example made of titanium or titanium alloy.

Just like the hollow core 5, the skin 6 is made of composite material. It may nonetheless comprise an outer layer of titanium or titanium alloy in order to provide mechanical protection (from erosion and/or impacts) for the profile. The outer layer may cover all or part of the aerodynamic profile. Partial coverage of the most exposed regions, in particular at the leading edge 1, is conceivable.

The skin 6 may be intimately joined to the hollow core 5. That can be obtained during manufacture of the aerodynamic profile. Indeed, the core, and, according to some embodiments, the entire profile, may for example be obtained by known methods for low-pressure injection of resin, generally known as resin transfer moulding or RTM, or by a liquid resin infusion method, or LRI.

Generally, the profile may be obtained—depending on its size, its complexity of shape and the elements that make it up—in one or more phases of polymerization of the constituent composite material.

Indeed, the composite material used is preferably a material having a thermosetting matrix. In particular, the composite material may have a polymer matrix.

In order to have the required mechanical properties, in particular for reacting the loads applied to the aerodynamic profile, the composite material is reinforced with fibers. In particular, the material may comprise a textile having unidirectional fibers (or "unidirectional textile"). In particular, a fabric having unidirectional fibers (or "unidirectional fabric") may be used, that is to say a fabric comprising a mass per unit area of warp (or, respectively, weft) threads considerably higher than its mass per unit area of weft (or, respectively, warp) threads. In other words, the fibers making up a unidirectional fabric are predominantly oriented in one direction, parallel to one another. That lends the fabric considerable mechanical properties in that direction.

The unidirectional textile used may be a fabric comprising carbon fibers or a fabric of carbon fibers.

The orientation of the fibers is important in order to lend the desired mechanical characteristics to the part made of composite material.

The composite material may comprise one or more plies of reinforcing textile, that is to say one or more layers or laminas. The plies can have the same orientation, or, in order to provide the desired mechanical properties in multiple directions, according to different orientations from one ply to another.

In general, the reinforcing fibers should be oriented in the direction that is "load-bearing" owing to the application of mechanical loads. For a profile subject to substantial shear loads, the fibers, that is to say the predominant fibers of the unidirectional fabric, may generally be provided with the following orientations. The orientations are given according to the reference system shown in FIG. 1.

For the hollow core 5, at the suction-side wall 51 and the pressure-side wall 52, the primary fibers (either weft or warp) of the unidirectional fabric are oriented in a reference direction, referred to as 0°. In the present case, this is an orientation parallel to the plane of extent of the skin 6 (that is to say, at the point in question, either at the plane of extent proper if the skin is planar, or at the plane defined by the tangents of the radii of curvature of the skin). In this plane, the fibers are typically oriented perpendicular to the chord of the aerodynamic profile.

The hollow core 5 comprises two connecting walls 53 between its suction-side wall 51 and its pressure-side wall 52. These connecting walls 53, while preferably rounded, may be essentially orthogonal to the chord of the profile. The fibers located in the connecting walls 53 may be oriented at approximately 45° and/or 135° (relative to the reference direction at 0°).

Equally, the skin 6 may comprise or be formed of a composite material reinforced with a unidirectional textile whose fibers (for example carbon fibers) are predominantly oriented at 45° and/or 135°.

This results in a structure that is lightweight and has great mechanical properties (resistance to deformation, to breaking, in particular to shear, etc.) in the most stressed directions.

Nonetheless, for a profile subjected to large loads, it is possible to adopt one or more of the features described with reference to FIG. 3. The aerodynamic profile shown in FIG. 3 is essentially identical to that shown in FIG. 2, with the exception of the characteristics set out below. Thus, all of the description of the profile of FIG. 2 applies to that of FIG. 3.

The aerodynamic profile shown in FIG. 3 comprises a transverse beam 7 arranged in the hollow core. This beam extends transversely in the thickness of the profile, that is to say perpendicular to the longitudinal direction defined by the chord of the profile. It therefore extends parallel to the conventional direction of extent of a spar. The beam 7 serves to stiffen the aerodynamic profile. The beam 7 may have an essentially rectangular cross section that is constant or varies. It is shaped so as to bear against an inner face of the suction-side wall 51 and of the pressure-side wall 52 to which it is connected so as to react loads to which the aerodynamic profile is subjected. The closed cross section of the beam makes it very stiff, so that the aerodynamic profile is also very stiff in the region in which the beam 7 is installed.

The beam 7 is made of composite material, identical to or compatible with that which makes up the hollow core 5. The beam 7 is itself hollow so as to be very lightweight.

Moreover, the hollow volumes of the aerodynamic profile of FIG. 3 are filled with a foam.

The hollow volumes defined in the profile are:
the internal volume of the hollow core 81;
if applicable, the internal volume of the beam 82;
the internal volume of the leading edge 84; and
the internal volume of the trailing edge 85.

Each internal volume can be filled with a different foam. Different foam(s) is to be understood as meaning foams that differ in their nature (composition) and/or their physical properties such as their density. Nonetheless, some or all of the abovementioned internal volumes can be filled with the same foam.

The foam used can be a polymethacrylimide foam.

A first foam can be used for filling the internal volume of the hollow core 81 and, if applicable, the internal volume of the beam 82. For example, a first foam having a density of the order of 60 kg/m$^3$ (for example between 40 kg/m$^3$ and 80 kg/m$^3$) may be used. The first foam can be a polymethacrylimide foam.

A second foam may be used to fill the internal volume of the leading edge 84 and the internal volume of the trailing edge 85. For example, a second foam having a density of the order of 200 kg/m$^3$ (for example between 150 kg/m$^3$ and 250 kg/m$^3$) may be used. The greater density of the second foam compared to that of the first foam may be necessary in so far as the second foam serves as a reinforcement or even as a substrate for the skin 6 at the leading edge 1 and the trailing edge 2. The second foam can be a polymethacrylimide foam.

In the example shown in FIG. 3, all of the hollow volumes of the profile are filled, but, according to variants of the disclosure herein, it is possible for just one of these abovementioned volumes to be filled, or for some of these volumes to be filled.

For example, if the mechanical properties obtained for the aerodynamic profile by virtue of the hollow core 5 and, if applicable, the beam 7 are sufficient, it is possible for only the internal volume of the leading edge 84 and the internal volume of the trailing edge 85 to be filled with foam. If it is judged that only the leading edge requires reinforcement, for example from impacts, it is possible for just the internal volume of the leading edge 84 to be filled with foam. Any combination of abovementioned volumes filled with or left without foam is possible, depending on requirements.

Moreover, the implementation of a transverse beam 7 in the hollow core 5 does not require that the internal volumes or some internal volumes be filled with foam. Thus, the beam 7 and filling with foam are two features that can be adopted independently of one another.

Whatever the embodiment in question, the matrix used in the composite material that respectively makes up the various elements of the profile (hollow core 5, skin 6, beam 7) may be the same, or may differ. Advantageously, the composite materials used are at the very least compatible with one another, in particular such that the elements of the aerodynamic profile, if they are not formed at the same time during manufacture of the aerodynamic profile, can be intimately joined to one another.

The disclosure herein so developed proposes an aerodynamic profile having a structure that is simple and lightweight, has optimized mechanical properties (such as bending moment and shear strength), and makes it possible to create aerodynamic profiles of particularly complex shape. The disclosure herein greatly reduces the number of parts that are to be assembled. It may make it possible to reduce the cost of obtaining aerodynamic profiles. It applies in particular to aerodynamic profiles of aircraft, in particular of aeroplanes.

The disclosure herein may find application in other profiles such as foils used in the nautical field, in particular on boats.

While at least one exemplary embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A profile for aerodynamic or hydrodynamic applications, the profile comprising:
    a skin defining an outer surface of the profile;
    a leading edge;
    a trailing edge;
    a central portion representing at least 50% of a chord of the profile;
    a hollow core comprising composite material, which comprises a matrix and a textile having unidirectional fibers, the hollow core having, in cross section, an oblong shape that is rounded at each of its ends; and
    a transverse hollow beam, which has an essentially rectangular cross-section, arranged in the hollow core, the hollow beam extending transversely in a thickness of the profile and being made of composite material;
    wherein the skin bears against the hollow core over a length of the central portion of the profile, both on a pressure side of the profile and on a suction side of the profile; and
    wherein the profile is a profile selected from the group consisting of: a wing, an aileron, a wingtip winglet, an empennage, a fairing, a flap, and a foil.

2. The profile according to claim 1, wherein the skin comprises a composite material or a composite material covered with a metallic outer layer.

3. The profile according to claim 2, wherein the composite material of the skin comprises a matrix and a textile having unidirectional fibers.

4. The profile according to claim 1, wherein the matrix is a polymer matrix.

5. The profile according to claim 1, wherein the hollow core comprises at least one planar outer surface.

6. The profile according to claim 1, wherein the hollow core has a suction-side wall, a pressure-side wall, and two connecting walls between the suction-side wall and the pressure-side wall, and wherein fibers of the suction-side wall and of the pressure-side wall are predominantly oriented parallel to the skin, along a reference direction that is inclined relative to the chord of the profile.

7. The profile according to claim 6, wherein:
    the skin comprises a composite material or a composite material covered with a metallic outer layer;
    the composite material of the skin comprises a matrix and a textile having unidirectional fibers; and
    the fibers of the skin are oriented at an angle with respect to the reference direction.

8. The profile according to claim 7, wherein the angle is 45° or 135°.

9. The profile according to claim 6, wherein the reference direction is perpendicular to the chord of the profile.

10. The profile according to claim 9, wherein fibers of the connecting walls are oriented at an angle of 45° or approximately 135° with respect to the reference direction.

11. The profile according to claim 9, wherein:
    the skin comprises a composite material or a composite material covered with a metallic outer layer;
    the composite material of the skin comprises a matrix and a textile having unidirectional fibers; and
    the fibers of the skin are oriented at an angle of 45° or 135° with respect to the reference direction.

12. The profile according to claim 1, wherein at least one of a first internal volume, which is defined by the hollow core over the length of the central portion in which the hollow beam is arranged, is filled with a first foam and/or a second internal volume, which is defined by the skin at the leading edge and the trailing edge, is filled with a second foam.

13. The profile according to claim 12, wherein the second foam has a density that is greater than a density of the first foam.

14. The profile according to claim 1, wherein the foil is a boat foil for the hydrodynamic application.

15. The profile according to claim 1, wherein:
    the hollow core has a suction-side wall, a pressure-side wall, and two connecting walls between the suction-side wall and the pressure-side wall;
    fibers of the suction-side wall and of the pressure-side wall are predominantly oriented parallel to the skin, along a reference direction perpendicular to the chord of the profile;
    fibers of the connecting walls are oriented at an angle of 45° or 135° with respect to the reference direction;
    the skin comprises a composite material or a composite material covered with a metallic outer layer;
    the composite material of the skin comprises a matrix and a textile having unidirectional fibers; and
    the fibers of the skin are oriented at an angle of 45° or 135° with respect to the reference direction.

16. The profile according to claim 1, wherein the hollow core extends over all of the central portion of the profile.

17. The profile according to claim 1, wherein at least one of a first volume, which is defined by the hollow core over the length of the central portion in which the hollow beam is arranged, a second volume defined by the volume of the hollow beam, a third volume defined by the leading edge, and a fourth volume defined by the trailing edge are filled with foam, some or all of the first, second, third, and fourth volumes being filled with a same foam.

* * * * *